W. E. GROVER.
COUPLING FOR PUMPS.
APPLICATION FILED APR. 19, 1910.
982,134.
Patented Jan. 17, 1911.
2 SHEETS—SHEET 1.
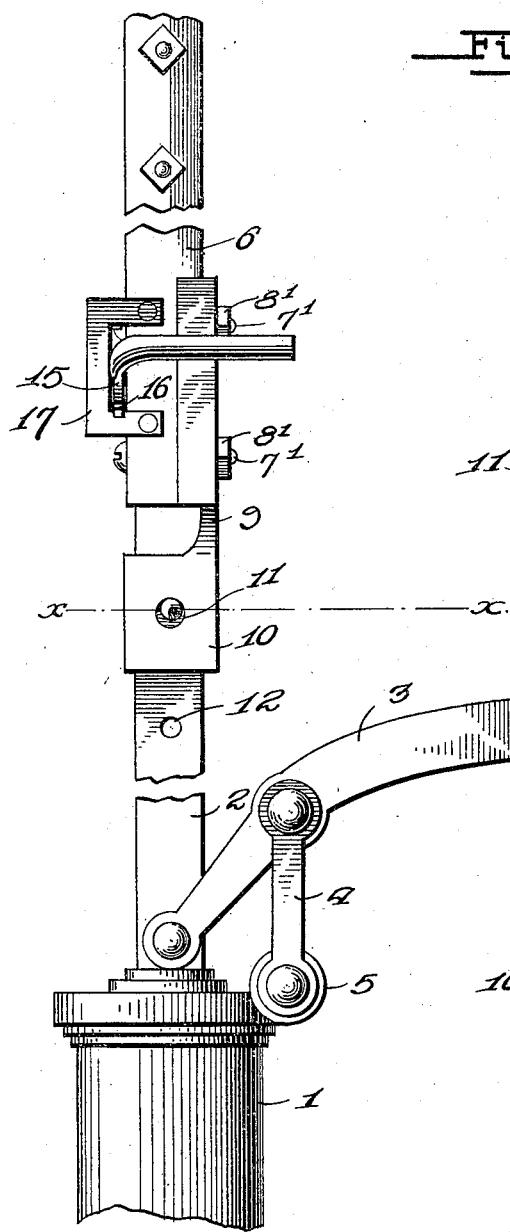
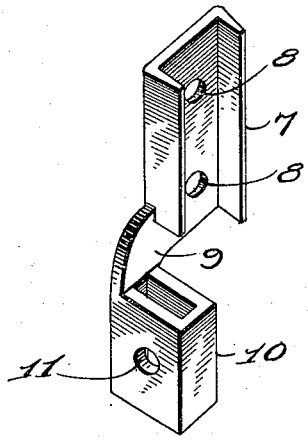
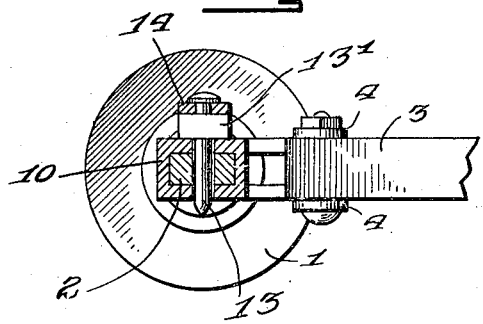
Witnesses
Inventor
William E. Grover,
By
Attorney.
THE NORRIS PETERS CO., WASHINGTON, D. C.

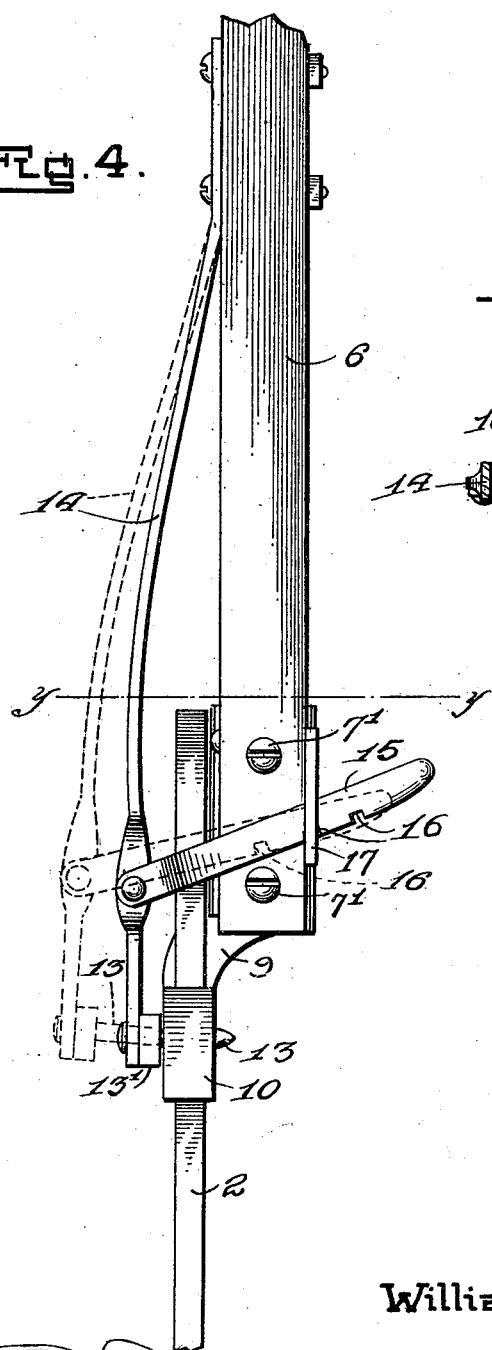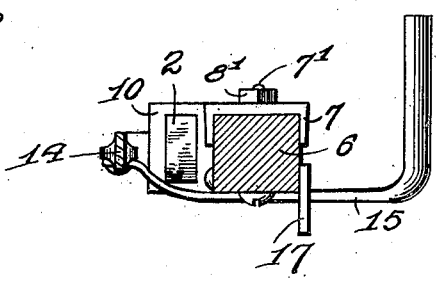

UNITED STATES PATENT OFFICE.

WILLIAM E. GROVER, OF BURT, IOWA.

COUPLING FOR PUMPS.

982,134.

Specification of Letters Patent.   Patented Jan. 17, 1911.

Application filed April 19, 1910. Serial No. 556,349.

*To all whom it may concern:*

Be it known that I, WILLIAM E. GROVER, a citizen of the United States of America, residing at Burt, in the county of Kossuth and State of Iowa, have invented certain new and useful Improvements in Couplings for Pumps, of which the following is a specification, reference being had therein to the accompanying drawing.
This invention relates to that class of coupling devices which are employed to couple a windmill and pump together, and has for its object to provide an improved coupling device, by means of which the windmill rod may be readily secured to and detached from the pump rod.

The invention further has for its object to provide a simple and effective device of this character which may be readily manipulated and is adapted to couple the parts so that the pump may be operated either by the windmill or by the hand.

Referring to the accompanying drawings,—Figure 1 is a view in elevation with parts broken away, showing a windmill coupling in position for use, and constructed in accordance with this invention. Fig. 2 is a detail view in perspective of a portion of the coupling. Fig. 3 is a plan view in horizontal section on line x—x of Fig. 1. Fig. 4 is an enlarged view in elevation showing the coupling connecting a windmill rod with a pump rod. Fig. 5 is a plan view in horizontal section on the line y—y of Fig. 4.
Referring to the accompanying drawings, 1 indicates a portion of the cylinder of a pump, and 2 the piston or pump rod, which has pivoted thereto one end of a pump handle, 3, connected by a link, 4, pivoted at one end of the handle 3, to a bracket, 5, and the cylinder 1, to which the other end of the link 4 is pivoted. The pump rod 2 is connected to the windmill rod 6, by means of a coupling consisting of the angular shoe portion, 7, having bolt holes, 8, and fitting over the windmill rod 6, and secured thereto by bolts 7' and nuts 8'. The shoe portion 7 is formed with a lateral arm, 9, from which depends a rectangular sleeve, 10, having alining holes, 11, in its sides. The pump rod 2 extends up through the sleeve 10, and is provided with holes 12, spaced apart, which when brought into alinement with the holes 11 of the sleeve 10, are adapted to receive a pin, 13, projecting through said holes 11. The pin 13 is mounted on the lower end of a spring arm, 14, secured at its upper end to the windmill rod 6, the pin 13 mounted on the lower end of arm 14, provided with a spacing nut 13' located between the arm 14 and the sleeve 10. The arm 14 is operated by suitable means, and as here shown, preferably by means of an arm, 15, hinged to the arm 14, and projecting through an angular plate, 17, secured to the rod 6, and serving as a keeper, the arm 15 having notches, 16, by means of which it may be locked in engagement with the keeper 17.

It will be seen that by means of this coupling the pump rod and the windmill rod will be securely coupled together, and that when there is no wind and the windmill cannot be used, the windmill rod may be easily and quickly uncoupled from the pump rod by unlatching the arm 15 and pushing the rod 14 back so as to release the pin 13 from the pump rod 2. In this position as shown in dotted lines in Fig. 4, the pin 13 may be held out of the way by latching the arm 15 with the keeper 17, and when it is desired to couple the windmill rod and pump rod together by slightly pushing the arm 15 out of engagement with the keeper 17, the arm 14 under tension, will snap back to its normal position, thereby quickly bringing the pin 13 into engagement with the pump rod 2. When the windmill rod is disconnected from the pump rod, the latter may be manually operated by means of the pump handle 3.

I do not limit myself to the use of this invention with a windmill rod, as this coupling may be used with any kind of pumping power, such as windmill, gasolene engine, tread power and horse power, or any power used to pump. It is for the purpose of saving time and trouble. It is always right where it belongs—not like the old way, bolts lost, bur or key gone, as this means fifteen to thirty minutes to get in working order again. But with this coupling, nothing can be lost as it is all in one, and can be coupled and uncoupled in an instant.

Having described the invention, I claim:

1. A device of the character described comprising a coupling member, a spring arm for securing a pump rod to said coupling member, and adapted to be secured to a power rod, a bracket adapted to be secured to said power rod, a latching arm pivoted to said spring arm and adapted to pass through said bracket, the said latching arm being provided with notches to engage said bracket to retain said spring arm out of engagement with said coupling member.

2. A device of the character described comprising a coupling member, a power rod secured to said coupling member, a pump rod slidably connected to said coupling member, a spring arm for securing said pump rod to said coupling member, a bracket secured to said power rod, a latching arm pivoted to said spring arm and passing through said bracket, the said latching arm being provided with notches to engage said bracket to retain said spring arm out of engagement with said coupling member.

In testimony whereof I hereunto affix my signature in presence of two witnesses.

WILLIAM E. GROVER.

Witnesses:
J. W. SULLIVAN,
S. E. McMAHON.